United States Patent [19]
Menzel et al.

[11] 3,856,726
[45] Dec. 24, 1974

[54] THERMOPLASTIC COMPOUND OF POLYBUTENE-1

[75] Inventors: Gerhard Menzel; Eckhard Seidel; Gunther Jaenichen, all of Marl, Germany

[73] Assignee: Chemische Werke Huls Aktiengesellschaft, Marl, Germany

[22] Filed: Sept. 14, 1972

[21] Appl. No.: 289,164

[30] Foreign Application Priority Data
Sept. 15, 1971 Germany............................ 2146068

[52] U.S. Cl.... 260/23 H, 260/28.5 R, 260/45.85 R, 260/45.95 R
[51] Int. Cl......................... C08f 19/14, C08f 21/14
[58] Field of Search.. 260/23 H, 41 R, 45.8, 28.5 R, 260/94.9 GD, 45.85 R, 94.9 C, 28.5; 252/57

[56] References Cited
UNITED STATES PATENTS

| | | | |
|---|---|---|---|
| 3,210,305 | 10/1965 | Coenen............................ | 260/28.5 |
| 3,285,855 | 11/1966 | Dexter................................. | 252/57 |
| 3,378,516 | 4/1968 | Tholstrup.......................... | 260/23 H |
| 3,580,898 | 5/1971 | Rosen .......................... | 260/94.9 C |
| 3,622,530 | 11/1971 | Branchesi ........................ | 260/23 H |
| 3,717,608 | 2/1973 | Hindersinn............................ | 260/28 |
| 3,721,635 | 3/1973 | Fellows................................ | 260/28 |

Primary Examiner—Donald E. Czaja
Assistant Examiner—William E. Parker
Attorney, Agent, or Firm—Millen, Raptes & White

[57] ABSTRACT

Dielectric constant and long-term hydrostatic strength properties of polybutene-1 high-tension cable insulation are improved by the presence therein of up to 1% by weight of magnesium oxide or other water insoluble magnesium compound and up to 1% by weight of a phenolic antioxidant, which improvement is further enhanced by up to 10% by weight of a paraffin of a molecular weight of 400 – 10,000.

11 Claims, No Drawings

THERMOPLASTIC COMPOUND OF POLYBUTENE-1

BACKGROUND OF THE INVENTION

This invention relates to a thermoplastic polybutene-1 composition suitable for use as insulation for high-tension cables.

The magnitude of the dielectric losses is of critical importance for insulation for high-tension cables, since the frequency-dependent supplementary losses increase with the square of the transmission voltage. Consequently, a low dielectric constant and a low loss angle tan δ are required for high-tension cables, so that heating up of the cable is avoided and the dielectric power losses from the cable are kept to a minimum. Also, under the effect of high tension current, the long-term hydrostatic strength of cable insulation should be as high as possible.

It is desirable to employ, for such insulating purposes, the inexpensive low-pressure polyolefins, primarily polybutene-1, especially since this thermoplastic can readily be manufactured with the desired properties, e.g., the desired molecular weight, by various modifications of, for example, the mixed catalyst during the polymerization. However, the long-term hydrostatic strength and the loss factor of polybutene-1 generally are insufficient or are satisfactory only in a few instances.

It is an object of the present invention to provide polybutene-1 compositions having the aforementioned properties.

SUMMARY OF THE INVENTION

According to this invention, polybutene-1 compositions suitable for use as insulation for high tension cables are provided containing an effective amount, e.g., about 0.005% to up to 1% by weight, preferably up to 0.5%, more preferably 0.01 – 0.1% by weight, of a water-insoluble magnesium compound and about 0.2% up to 1% by weight, preferably up to 0.5%, more preferably 0.2 – 0.4% by weight, of a phenolic antioxidant and, optionally but preferably, up to 10% by weight of a paraffin having a molecular weight of 100 – 10,000.

DETAILED DISCUSSION

Suitable polybutene-1 polymers for use in the compositions of this invention are those obtained according to the low-pressure polymerization methods, preferably the Ziegler process, especially using a mixed catalyst of compounds of tetravalent and trivalent titanium, e.g., titanium tetrachloride and titanium trichloride, on the one hand, and organometallic compounds of aluminum, on the other hand.

The molecular weights of the solid polybutene-1 can range, e.g., from about 500,000 to 3,000,000, preferably from 1,000,000 to 2,000,000. The polybutene-1 preferably has a proportion, insoluble in diethyl ether, of 90 – 99.5% by weight.

The term "water-insoluble magnesium compound" means any organic or inorganic magnesium which is soluble to the extent of less than about $1 \times 10^{-3}$ % at about room temperature, e.g., magnesium oxide, magnesium hydroxide, a magnesium salt of a fatty acid, preferably containing 10–25 carbon atoms, e.g., magnesium laurate, palmitate and stearate. Magnesium silicate is effective, too.

The phenolic antioxidants which can be employed include those conventionally used to stabilize polyolefins, particularly polybutenes. Preferred are 2,6-di-tert.-butyl-phenols, especially those also substituted in the para-position. For a discussion of phenolic antioxidants, see "Stabilization of Polymers and Stabilizer Processes," Advances in Chemistry Series 85 (American Chemical Soc.).

Examples of suitable phenolic antioxidants are compounds of the general formula

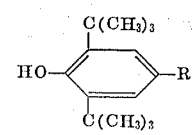

wherein R is a saturated or unsaturated alkyl group of 1–25 carbon atoms, a mono- or polynuclear aryl or aralkyl residue, a fatty acid acyl group of 2–25 carbon atoms, or an ester thereof with an alcohol or thioalcohol of 1–25 carbon atoms or with a polyhydric alcohol of 1–5 carbon atoms whose OH groups can be partially or completely esterified with a fatty acid or the derivative thereof.

Accordingly, R can be, for example, alkyl, including methyl, ethyl, n-propyl, isopropyl, n-butyl, isobutyl, n-pentyl, isopentyl, n-hexyl and isohexyl, but preferably octyl, dodecyl, myristyl, cetyl and stearyl; aryl, e.g., phenyl and naphthyl, aralkyl, e.g., formed from the above aryl and alkyl groups; fatty acid groups, e.g., acetic acid, but preferably propionic acid, furthermore butyric acid, valeric acid, caproic acid, palmitic acid and stearic acid; esters thereof with a monohydric alcohol or thioalcohol of 1–25 carbon atoms, e.g., methyl, ethyl, propyl, n-butyl, isobutyl, n-pentyl, isopentyl, n-hexyl, isohexyl, n-heptyl, isoheptyl, n-octyl, isooctyl, n-nonyl, n-decyl and isodecyl alcohol, especially cetyl and stearyl alcohol, or with a polyhydric alcohol of 1–5 carbon atoms, e.g., glycol, glycerin, preferably pentaerythritol, whose OH groups can be partially or completely esterified with one of the aforementioned carboxylic acids or the derivative thereof.

Specific examples of suitable phenolic antioxidants are 2,6-di-tert.-butyl-p-cresol

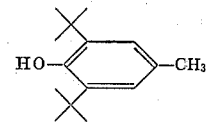

1,3,5-trimethyl-2,4,6-tris(3,5-di-tert.-butyl-4-hydroxybenzyl)benzene

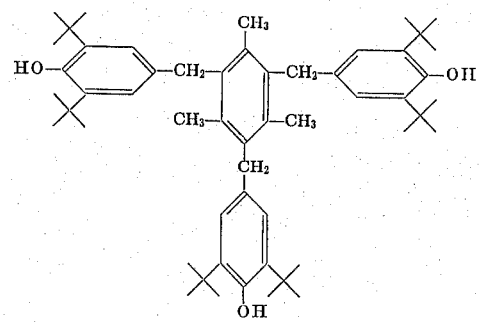

n-octadecyl-β-(4-hydroxy-3,5,-di-tert-butylphenyl)-propionate

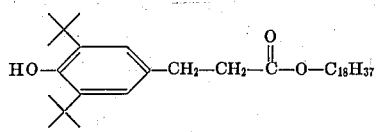

tetrakis[methylene-(4-hydroxy-3,5-di-tert.-butyl)-hydrocinnamate]

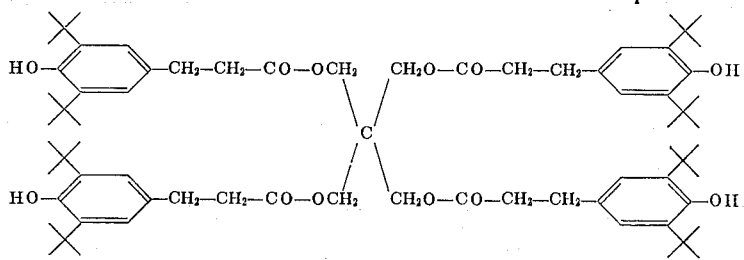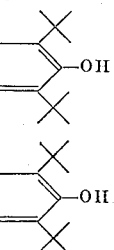

The phenolic antioxidants, by themselves, produce only minor long-term high-tension hydrostatic strength. However, when these antioxidants are combined with a water insoluble magnesium compound, a synergistic effect surprisingly occurs which increases the high-tension long-term hydrostatic strength considerably and improves the electrical dissipation factor.

A further synergistic effect takes place surprisingly by providing an additional content of up to 10%, preferably 0.05 to 5%, more preferably 0.5 – 2% by weight of a paraffin having a molecular weight of 100–10,000, preferably 500–3,000, which is optionally branched, oxidized, or substituted by alkyl, aryl, aralkyl or acyl. Such paraffins are obtained by the Fischer-Tropsch synthesis.

The additives can be incorporated by mixing the polymer in powder form in a high-speed mixer therewith.

The additives effect a substantial improvement in the electrical properties of polybutene-1. An especially valuable aspect is that the mechanical properties of the polymers are not adversely affected by the additives.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Polybutene-1 powder (ether-insoluble proportion 96%; molecular weight 1,500,000) is intimately mixed in a high-speed mixer with tetrakis[methylene-(4-hydroxy-3,5-di-tert.-butyl)-hydrocinnamate] and with magnesium oxide to a content of 0.3% by weight and 0.01% by weight, respectively. The mixture is then granulated.

The thus-obtained granulated polybutene-1 composition is solid at room temperature, after cooling, and can be formed into molded components on an automatic injectionmolding machine or processed into a rod or hose (cable insulation) on an extruder.

EXAMPLE 2

In a similar manner as in Example 1, polybutene-1 powder is worked into a mixture containing 0.3% by weight of phenolic antioxidant and 0.1% by weight of magnesium oxide with the aid of a high-speed mixer and the mixture is then granulated. The thus-obtained granulated composition is solid at room temperature, after cooling, and can be injection-molded into articles by an automatic injectionmolding machine or processed on an extruder to a rod or hose for cable insulation.

EXAMPLE 3

Following the procedure of Example 1, polybutene-1 powder is processed in a high-speed mixer into a mixture with a content of 0.3% by weight of phenolic antioxidant, 0.1% by weight of magnesium oxide, and 1% by weight of Fischer-Tropsch paraffin having an average molecular weight of 1,500. Thereafter, the mixture is granulated. The thus-produced granulated material is solid, after cooling, and can be injection-molded into components by an automatic injection-molding machine or processed by an extruder into a rod or hose for cable insulation.

The following table indicates for high-tension long-term hydrostatic strength at 28 kilovolts, as well as the dissipation factor tan δ in dependence on the temperature for the polybutene compositions of Examples 1–3. For comparison, the values of a conventional insulation made of 100 parts of unmodified polybutene-1 are likewise set forth.

|  | Long-Term Hydrostatic Strength at 28 kv (min · 10³) | Dissipation Factor tan δ · 10⁻⁴ at | | |
|---|---|---|---|---|
|  |  | 20°C. | 60°C. | 100°C. |
| 100 Parts polybutene-1 | 10 | 3 | 3 | 10 |
| 100 Parts polybutene-1 0.3 Parts antioxidant* 0.01 Parts Mg oxide | 10 | 1 | 1 | 2 |
| 100 Parts polybutene-1 0.3 Parts antioxidant* 0.1 Parts Mg oxide | 25 | 2 | 2 | 2 |
| 100 Parts polybutene-1 0.3 Parts antioxidant* 0.1 Parts Mg oxide 1 Part paraffin | >100 | 1 | 0.6 | 2 |

*=Tetrakis[methylene-(4-hydroxy-3,5-di-tert,-butyl)-hydrocinnamate].

Comparable results are achieved by replacing the polybutene-1 employed above by one having an ether-insoluble proportion of 92% and a molecular weight of 2,500,000, or by utilizing, in place of tetrakis[methylene-(4-hydroxy-3,5-di-tert.-butyl)-hydrocinnamate] as the antioxidant 0.1 or 0.5 part of n-octadecyl-β-(4-hydroxy-3,5-di-tert.-butyl-phenyl)-propionate; 1,3,5-trimethyl-2,4,6-tris(3,5-di-tert.-butyl-4-hydroxybenzyl)benzene; or 2,6-di-tert.-butyl-p-cresol. In a similar manner, the magnesium oxide can be replaced by 0.1 part of magnesium hydroxide or by 0.1 and/or 1.0 part of magnesium stearate, laurate or palmitate.

A further increase in long-term hydrostatic strength is attained by addiing to the aforementioned mixtures 8 parts of a paraffin having an average molecular weight of 1,200 or 5 parts of a highly branched paraffin having an average molecular weight of 2,800. In these instances, the values for tan δ are still further lowered, without any noticeable impairment of the mechanical properties of the resultant compositions.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermoplastic polybutene-1 composition consisting essentially of an admixture of solid polybutene-1 and an amount of up to 1% by weight of a water-insoluble magnesium compound having a solubility in water of less than about $1 \times 10^{-3}$ at room temperature and an amount of up to 1% by weight of a phenolic antioxidant for polyolefins effective to improve the high-tension insulating properties of the polybutene-1, substantially free from other organic compounds.

2. A polybutene-1 composition according to claim 1 containing 0.01 – 0.1% by weight of the magnesium compound.

3. A polybutene-1 composition according to claim 1 wherein the magnesium compound is magnesium oxide.

4. A polybutene-1 composition according to claim 1 wherein the magnesium compound is magnesium hydroxide.

5. A polybutene-1 composition according to claim 1 wherein the magnesium compound is magnesium stearate, laurate or palmitate.

6. A polybutene-1 composition according to claim 1 wherein the phenolic antioxidant is tetrakis[methylene-(4-hydroxy-3,5-di-tert.-butyl)-hydrocinnamate]; n-octadecyl-δ-(4-hydroxy-3,5-di-tert.-butylphenyl)-propionate; 1,3,5-trimethyl-2,4,6-tris(3,5-di-tert.-butyl-4-hydroxybenzyl)-benzene; or 2,6-di-tert.-butyl-p-cresol.

7. A polybutene-1 composition according to claim 1 wherein the polybutene-1 has a molecular weight of from about 500,000 to 3,000,000 and is 90–99.5% diethyl ether insoluble.

8. A polybutene-1 composition according to claim 7 wherein the magnesium compound is magnesium oxide and the phenolic antioxidant is tetrakis[methylene-(4-hydroxy-3,5-di-tert.-butyl)-hydrocinnamate].

9. A polybutene-1 composition according to claim 1 wherein the polybutene-1 has a molecular weight of from about 500,000 to 3,000,000 and is 90–99.5% diethyl ether insoluble.

10. A polybutene-1 composition according to claim 1 wherein the phenolic antioxidant is a para-substituted 2,6-di-tert.-butyl-phenol.

11. A polybutene-1 composition according to claim 10 wherein the magnesium compound is selected from the group consisting of magnesium oxide, magnesium hydroxide, a magnesium salt of a fatty acid and magnesium silicate.

* * * * *